United States Patent [19]

Miyaji et al.

[11] 4,320,414

[45] Mar. 16, 1982

[54] ADJUSTING DEVICE FOR COLOR TELEVISION CAMERA APPARATUS

[75] Inventors: Yoshimori Miyaji, Tokyo; Hirokazu Fujiki, Asakusabashi; Fumio Takahashi, Inagi, all of Japan

[73] Assignee: Tokyo Shibaura Denki Kabushiki Kaisha, Japan

[21] Appl. No.: 138,556

[22] Filed: Apr. 8, 1980

[30] Foreign Application Priority Data

Apr. 27, 1979 [JP] Japan .................................. 54-52326

[51] Int. Cl.³ ............................................. H04N 9/09
[52] U.S. Cl. ..................................................... 358/51
[58] Field of Search ...................... 358/10, 21, 51, 217

[56] References Cited

U.S. PATENT DOCUMENTS 3,764,735 10/1973 Dieter-Schneider ................. 358/51
4,133,003 1/1979 Flory et al. ........................... 358/51

*Primary Examiner*—Richard Murray
*Attorney, Agent, or Firm*—Finnegan, Henderson, Farabow, Garrett & Dunner

[57] ABSTRACT

Disclosed is an adjusting device for a television camera apparatus which comprises a signal processing circuit for processing a video signal, a data detecting circuit for detecting an adjusting data from the processed video signal from the signal processing circuit, and an arithmetically operating circuit for calculating a correcting data from a reference data and the adjusting data from the data detecting circuit. The correcting data is converted by a correction signal circuit into an analog correction signal. This signal is supplied to the signal processing circuit and also to a deflection circuit. The reference data and connecting data are stored in a memory section comprised of a Randum Access Memory and a non-volatile memory. Both such reference data and correcting data are stored, at the time of adjusting the camera apparatus, in the Randum Access Memory and, upon completion of such adjustment, is transferred from the Randum Access Memory to the non-volatile memory. At the time of readjusting the camera apparatus they are transferred from the non-volatile memory to the Randum Access Memory.

9 Claims, 5 Drawing Figures

ADJUSTING DEVICE FOR COLOR TELEVISION CAMERA APPARATUS

BACKGROUND OF THE INVENTION

This invention relates to a television camera apparatus, and more particularly to an adjusting device for use in a color television camera apparatus.

During the operation of a conventional color television camera apparatus, an adjustment which is called "routine adjustment" is automatically carried out by means of an adjusting means built into the apparatus. In this type of adjustment a predetermined chart such as a registration chart is picked up by the camera apparatus and the video signal from the camera corresponding to that predetermined chart is supplied to a signal processing section incorporated in the apparatus. In the signal processing section the video signal is subjected to gain control, gamma correction, pedestal level correction, conversion, etc. The video signal thus processed is supplied to a data detecting section. In this section the adjusting data is detected from the video signal. The adjusting data is supplied to an arithmetic operation section. In this section, correcting data is calculated by comparing the adjusting data and with a reference data previously stored in a memory section. The correcting data is converted by a correcting signal circuit into an analog correcting signal and then is supplied to a deflecting circuit and also to a signal processing circuit. Further, the correcting data is stored in the memory section as new reference data.

Meanwhile, in a conventional adjusting device for the color television camera apparatus, the memory section is so constructed that the data stored therein may be kept stored for as long as there is power supplied to the memory section by means of, for example, a battery. For this reason, unless power supply to the memory section is maintained at all times, the data stored therein will extinguish. This extinguishment automatically stops the above-mentioned adjustment of the television camera. Further, such conventional adjusting device requires an exclusive power source for supply of the power to the memory section. This makes it difficult to miniaturize the adjusting device.

SUMMARY OF THE INVENTION

The object of the invention is to provide an adjusting device for a color television camera apparatus which uses a non-volatile memory as the memory section for storing reference data therein and which can prevent the extinguishment of the data stored in the memory section even if no power is supplied thereto.

According to the invention, the adjusting device for color television camera apparatus is provided with a signal processing section for processing the video signal corresponding to a prodetermined chart such as a registration chart, a data detecting section for detecting the adjusting data from the video signal thus processed, and an arithmetic operation section for calculating correcting data from the adjusting data supplied thereto from the data detecting section and from the reference data stored in a memory section including a non-volatile memory. The correcting data is stored in the non-volatile memory as new reference data.

DETAILED DESCRIPTION OF THE PREFERRED EMBODIMENT

Figure 1:
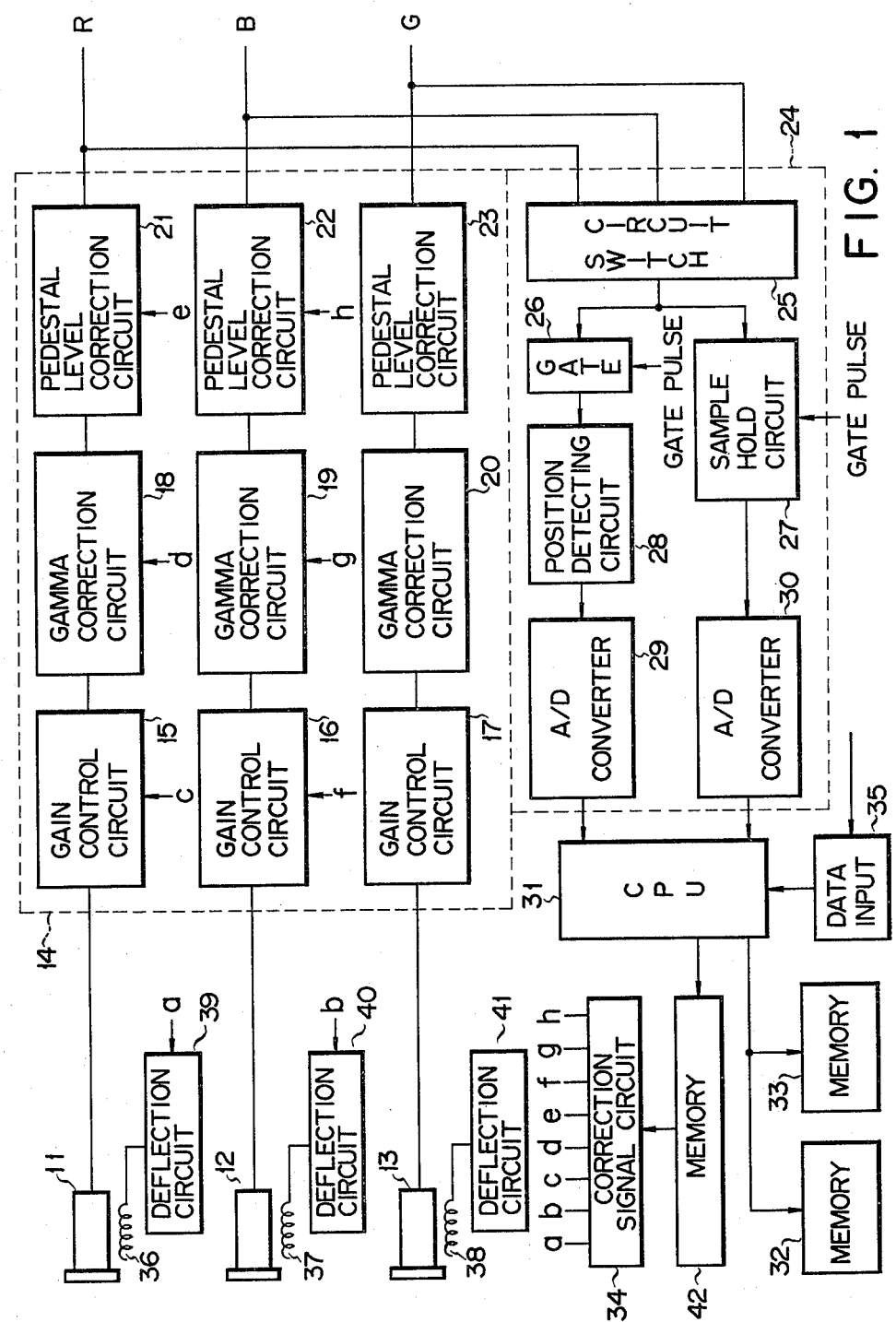
FIG. 1 is a circuit diagram showing an adjusting device for a color television camera apparatus in accordance with an embodiment of the invention.

Referring to FIG. 1, the outputs of red, blue and green color television tubes 11, 12 and 13 are connected, respectively to the input terminals of gain control circuits 15, 16 and 17 provided in a signal processing section 14. The output terminals of the gain control circuits 15, 16 and 17 are connected, respectively, to the input terminals of gamma correction circuits 18, 19 and 20. The output terminals of the gamma correction circuit 18, 19 and 20 are connected, respectively, to the input terminals of pedestal level correction circuits 21, 22 and 23. The output terminals of the pedestal level correction circuits 21, 22 and 23 are connected, respectively, to the input terminals R, B and G of a switch circuit 25 provided in a data detecting section 24. The output terminal of the switch circuit 25 is connected to the input terminal of a gate circuit 26 and to the input terminal of a sample hold circuit 26. The output terminal of the gate circuit 26 is connected to the input terminal of a position detecting circuit 28. The output terminals of the position detecting circuit 28 and sample hold circuit 27 are connected, respectively, to an arithmetic operation section, for example, CPU 31, via A-D converters 29 and 30.

Figure 5:
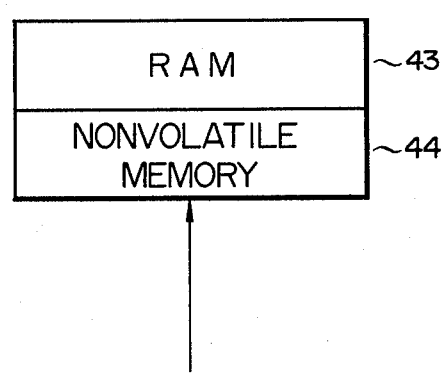
FIG. 5 is a circuit diagram showing a memory section of the adjusting device.

To CPU 31 are connected memories 32, 33 and 42 and data input device 35. To the memory 42 is connected a correction signal circuit 34. This circuit 34 includes a D-A converter which converts the digital data stored in the memory 42 into an analog signal. Each of the memories 32, 33 and 42 is constructed as shown in FIG. 5. Namely, each memory includes a RAM (Random Access Memory) 43 and a non-volatile memory 44. Both the memories 43 and 44 are constructed so that transfer of data can be effected from the memory 43 to the memory 44 or viceversa. When the power switch is turned off from the "on" state, the data in RAM 43 is transferred to the non-volatile memory 44. On the other hand, when the power switch is turned on from the "off state," the data theretofore stored in the non-volatile memory 44 is transferred from it to RAM 43. Deflection circuits 39, 40 and 41 are connected to deflection coils 36, 37 and 38 of the television camera tubes 11, 12 and 13.

Figure 2:
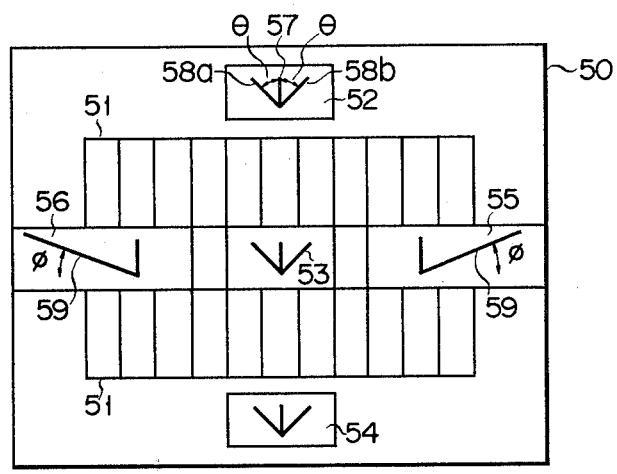
FIG. 2 is a test chart.

When, in the above-mentioned circuit construction, a test chart 50 as shown in FIG. 2 is picked up by the television camera tubes 11, 12 and 13, the video signals corresponding to the pattern of the test chart 50 are outputted from the camera tubes 11, 12 and 13. The test chart is provided with gray scale 51, substantially V-shaped reference markers 52, 53 and 54, and rotation detection markers 55 and 56. The reference markers 52, 53 and 54 each have a pair of lines 58a, 58b which are each inclined at an angle of $\theta = 45°$ with respect to a central axis 57. Each of the rotation detection markers 55 and 56 has a line 59 which is inclined at an angle of less than θ=45° with respect to the horizontal line.

Figure 3:
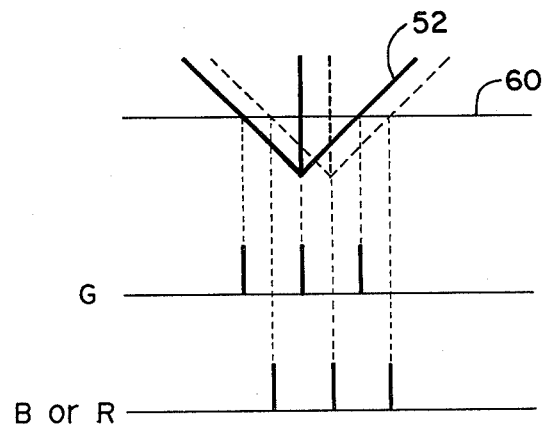
FIG. 3 is the waveform of a marker signal which corresponds to a rotation marker.

When supplied to the signal processing section 14, the three color video signals corresponding to the pattern of the test chart 50 having such markers as shown in FIG. 2 are subjected, by the gain control circuit, gamma correction circuit and pedestal level correction circuit involved in the section 14, to gain control, gamma correction and pedestal level correction, respectively. The three color video signals, R, B and G, which have passed through the signal processing section 14 are inputted to the three input terminals of the switch circuit 25 of the data detecting section 24. By this switch circuit 25 the G video signal is supplied to the gate circuit 26 and to the sample hold circuit 27. The gate circuit 26, in response to a gate pulse, supplies the G video signal to the position detecting circuit 28. From the marker pulse for the G video signal the marker position is detected by position detecting circuit 28. In this case, detection of the marker position is made by the marker pulse G which, as shown in FIG. 3, is generated when a scanning line 60 has passed through the marker 52. The detection signal thus obtained is converted by the A-D converter 29 into a digital signal and is stored, as a G marker data, in the memory 32.

Figure 4:
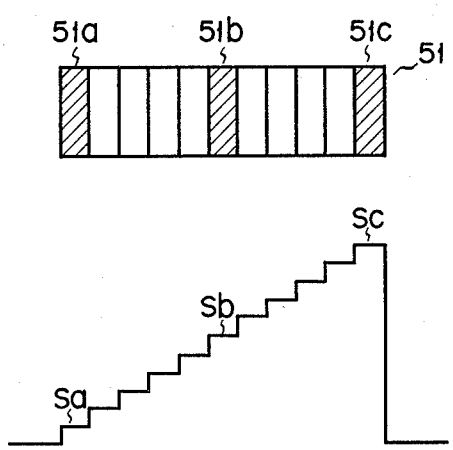
FIG. 4 is the waveform of a gray scale signal which corresponds to a gray scale.

In the sample hold circuit 27, the gray scale signals Sa, Sb and Sc corresponding to the regions 51a, 51b and 51c of the gray scale 51 shown in FIG. 4 are picked up, in response to the gate pulse, from the G video signal and then are converted by the A-D converter 30 into a digital signal and are then stored, as G gray scale data, in the memory 32.

Next, when the B video signal is supplied from the switch circuit 25 to the gate circuit 26 and also to the sample hold circuit 27, the marker pulse B and the gray scale signals Sa, Sb and Sc are obtained in the same manner as in the case of G video signal. The marker pulse B is converted by the A-D converter 29 into a digital B marker data. This B marker data and the G marker data of the memory 32 are compared with each other by CPU 31, whereby the difference between the B and G marker data is detected. The difference data is stored in the memory 42. In accordance with that difference data read from the memory 42, a feed back signal b is supplied from the correction signal circuit 34 to the deflection circuit 40 of the blue television camera tube 12, whereby the B deflection signal is allowed to coincide with the G deflection signal, i.e. a proper registeration is attained.

The gray scale sampling signals Sa, Sb and Sc of the B video signal are converted by the converter 30 into B gray scale data. This B gray scale data is compared by CPU 31 with the G gray scale data. The difference data is supplied to the correction signal via the memory 42. In accordance with the difference between the B and G gray scale data, a gain control signal f, gamma correction signal g, and pedestal level correction signal h are outputted from the correction signal circuit 34 and are respectively supplied to their corresponding circuits 16, 19 and 22.

In the same manner as above stated, the position detection of the marker is made in accordance with the R video signal and the sampling of the gray scale signal is also carried out. The marker pulse which is obtained from the position detection is converted into a digital R marker data, while the sampled signals which are obtained by sampling are converted into R gray scale data. The R marker data is compared with the G marker data whereby the difference between both is determined, while the R gray scale data are compared with the G gray scale data whereby the difference between both is determined. The correction signals a, c, d and e corresponding to such differences data are supplied from the correction signal circuit 34 to the corresponding circuits 39, 15, 18 and 21, respectively.

In the same manner as stated above, the B marker data and B gray scale data are compared, respectively, with the G marker data and G gray scale data, whereby the differences between the respective two are determined by CPU 31. From such difference data the correcting values are calculated. The correcting data corresponding to the correcting values thus obtained is stored, as new reference data, in the memory 32. By the position detection signals the data on the centering, size, linearity, rotation, registration, etc. are detected, while by the gray scale signals the data on the gamma, pedestal, gain, etc. are detected. The centering is performed on the basis of data of the marker 53. The adjustment of the vertical size is carried out on data of the markers 52 and 54, while the adjustment of the horizontal size on data of the markers 55 and 56. The adjustment of the vertical linearity is performed on data of the markers 52, 53 and 54.

In the above-mentioned operation, when the power for the camera apparatus is switched on to make the adjustment of the television camera apparatus, the data which has been stored in the non-volatile memory of the memory 42 in response to the "on" signal generating upon such turn-on of the power soruce is transferred to RAM 43. Namely, in FIG. 5, the data stored in the non-volatile memory 44 is transferred to and stored in RAM 43. Thereafter, calculation of the above-mentioned correcting data is carried out. In this case, however, the data produced from such calculation is stored in and read from RAM 43. When the completely adjusted television camera apparatus is used for broadcasting and this broadcasting is ended and the power for the apparatus is switched off, the data stored in RAM 43 is transferred, in response to the "off" signal then generated, to the non-volatile memory 44 and is thus stored in the same.

In the case of the memories 32 and 33, when the power switch is turned on, the data stored in the non-volatile memory 44 is transferred to RAM 43. Conversely, when the power switch is turned off, the data stored in RAM 43 is transferred to the non-volatile memory 44. That is to say, when the arithmetic operation of all adjusting data is completely by CPU 31, or when the processing of the manual correcting data as later described is completed, the data of RAM 43 is transferred to the non-volatile memory 44 and is thus held in the same. Conversely, during the arithmetic operation of the adjustment data or manual correcting data, data transfer is effected from the non-volatile memory 44 to RAM 43 and, on the basis of the data in RAM 43, calculation is performed of the correcting data.

Next, reference will now be made to the manual correction which is carried out on the basis of the manual correcting data inputted from the data input device 35. This manual correction is of the type wherein adjustment errors inherently occurring in the television camera apparatus are corrected by manually inputting the manual correcting data. In the manual correction, the adjusting signal which is obtained by controlling a pedestal adjuster or registration adjuster provided in a television camera control unit or color television camera head is supplied to the data input device 35. The adjusting signal is converted by the data input device 35 into a digital signal and then is supplied to the memory 33 via CPU 31 and is stored therein as a manual correcting data. This manual correcting data is one which is necessary to correct the registration, linearity, etc., for example, at the upper or lower portion of the picture screen. The manual correcting data is stored in the memory 83 while keeping the data detecting section 24 electrically disconnected and having such correcting data monitored by a waveform monitor. The manual correcting data is added to the reference data stored in the memory 32 and the resulting data is converted by the correction signal circuit 34 into a correction signal. This correction signal is supplied to the deflection circuit 39 or 40, whereby a desired manual correction on the deflection operation is carried out.

Thereafter, the data detecting section 24 is reconnected to CPU 31, whereby the above-mentioned reference adjustment is performed on the basis of the reference data stored in the memory 32. The adjustment errors peculiar to the television camera apparatus are corrected as above in accordance with the manual correcting data. This manual correcting data is not required to be inputted each time the manual correction is needed. For instance, if the use of the television camera apparatus remains unchanged, the total adjustment and correction operation for the television camera apparatus is automatically carried out if the manual correcting data stored in the memory 33 is supplied to CPU 31 together with the reference data in the memory 32.

As explained in the foregoing descriptions, each of the memories 32, 33 and 42 is constituted by a RAM and a non-volatile memory, and, when the power switch is turned off, the data in the RAM is transferred to the non-volatile memory to be stored in the same. Thereafter, the adjusting data cannot be lost during the "off" state of the power source. This means that when the power becomes "on" from such "off" state, no inconvenience occurs at all in the performance of the automatic adjustment. Further, the use of the non-volatile memory eliminates the necessity of providing an exclusive battery power source for the memory, and allows for the miniaturization of the camera apparatus. At the same time, this eliminates the necessity of maintenance, such as a check of the battery power source.

Further, since according to the invention the manual correcting data can be inputted from the data input device to CPU, the adjustment errors inherent in the camera apparatus can be corrected. Further, since the updated data for use in the adjustment of the television camera apparatus is stored in the output memory or memory 42, even if a power supply breakage trouble such as a power failure occurs in the course of the arithmetic, such adjustment can immediately be continued after the recovery of the power supply since the data immediately preceding said trouble is stored in the non-volatile memory. Further, according to the invention, the first and second memories, i.e., the memories 32 and 33 are controlled by CPU or a data input device and the RAM and the non-volatile memory are subjected to data transfer from the RAM to the non-volatile memory or viceversa. The desired data, therefore, is stored in either at all times.

What we claim is:

1. An adjusting device for a television camera apparatus which comprises:
   (a) a signal processing section for processing video signals which indicate the pattern of a test chart and which contain adjusting data,
   (b) a data detecting section for detecting the adjusting data from said video signals which are supplied from said signal processing section,
   (c) an arithmetic operation section for calculating correcting data from reference data and said adjusting data detected by said data detecting section,
   (d) a correction signal circuit for converting said correcting data calculated by said arithmetic operation section into a correcting signal and supplying said correcting signal to said signal processing section and also to a deflection circuit, and
   (e) a memory section for storing said reference data and said correcting data as reference data, said memory section including at least a non-volatile memory for storing said reference data during loss of power to said memory section.

2. An adjusting device according to claim 1, wherein said memory section includes a Random Access Memory and a non-volatile memory and wherein upon said loss of power to said memory section, said reference data and said correcting data are transferred from said non-volatile memory to said Random Access Memory and, after resumption of power to said memory section are transferred from said Random Access Memory to said non-volatile memory.

3. An adjusting device according to claim 1 or 2 wherein said memory section includes an output memory which temporarily stores said correcting data of said arithmetic operation section and transfers said correcting data thus temporarily stored to said correction signal circuit.

4. An adjusting device according to claim 3, wherein said output memory is comprised of a Random Access Memory and a non-volatile memory and wherein at the time when power supplied to said output memory is rendered ineffective said correcting data is transferred from said Random Access Memory to said non-volatile memory and, at the time when said power supply is rendered effective, is transferred from said non-volatile memory to said Random Access Memory.

5. An adjusting device according to claim 1, wherein said video signals are a Red (R) video signal, Blue (B) video signal and Green (G) video signal; and said data detecting section includes means for detecting adjusting data from said R, B and G video signals.

6. An adjusting device for a television camera apparatus which comprises:
   (a) a signal processing section for processing Red (R), Blue (B) and Green (G) video signals which indicate a test pattern having a gray scale, reference marker and rotation detection marker,
   (b) a data detecting section for receiving video signals from said signal processing section and detecting reference data including gray scale data and marker data,
   (c) an arithmetic operation section for calculating correcting data from said gray scale data and marker data detected by said data detecting section and reference gray scale data and marker data,
   (d) a correcting signal circuit for converting said correcting data calculated by said arithmetic operation section into a correcting signal and supplying said correcting signal to said signal processing section and a deflection circuit, (e) a manual correcting data generating means for manually issuing manual correcting data used to correct adjustment errors inherently occurring in said television camera apparatus, and (f) a memory section having at least a non-volatile memory for storing said manual correcting data and storing either one of said reference data and said calculated correcting data as reference data during loss of power to said memory section, whereby said arithmetic operation section adds said manual correcting data to said reference data to provide adjusting data.

7. An adjusting device according to claim 6, wherein said data detecting section first detects G gray scale data and marker data from said G video signal and then detects B and R gray scale data and marker data from said B and R video signals, respectively, and said arithmetic operation section causes said G gray scale data and marker data to be stored as reference data in said memory section and detects the difference between said B and R gray scale data and marker data and said G gray scale data and marker data to determine correcting data.

8. An adjusting device according to claim 6, wherein said manual correcting data generating means includes means for supplying to said memory section, via said arithmetic operation section, an adjusting signal generated by adjusting an adjusting member provided in a television control unit of said television camera apparatus.

9. An adjusting device according to claim 6, wherein said memory section includes a Random Access Memory and a non-volatile memory and wherein at the time of adjusting said television camera apparatus said reference data and said correcting data are transferred from said non-volatile memory to said Random Access Memory and, after completion of said adjustment, are transferred from said Random Access Memory to said non-volatile memory.

* * * * *